United States Patent
Ding et al.

(10) Patent No.: US 11,041,095 B2
(45) Date of Patent: Jun. 22, 2021

(54) DESULFURIZED TALL OIL AND DERIVATIVES THEREOF

(71) Applicant: Kraton Polymers LLC, Houston, TX (US)

(72) Inventors: Ruidong Ding, Houston, TX (US); Jason Tian, Houston, TX (US); Chad Reiter, Savannah, GA (US)

(73) Assignee: Kraton Polymers LLC, Houston, TX (US)

(*) Notice: Subject to any disclaimer, the term of this patent is extended or adjusted under 35 U.S.C. 154(b) by 0 days.

(21) Appl. No.: 15/929,779

(22) Filed: May 21, 2020

(65) Prior Publication Data

US 2020/0369916 A1    Nov. 26, 2020

Related U.S. Application Data

(60) Provisional application No. 62/851,373, filed on May 22, 2019.

(51) Int. Cl.

| | | |
|---|---|---|
| *C09F 1/02* | (2006.01) | |
| *B01D 15/10* | (2006.01) | |
| *B01J 20/10* | (2006.01) | |
| *B01J 20/20* | (2006.01) | |
| *B01J 20/28* | (2006.01) | |
| *B01J 20/34* | (2006.01) | |
| *C09F 1/04* | (2006.01) | |

(52) U.S. Cl.
CPC ............... *C09F 1/02* (2013.01); *B01D 15/10* (2013.01); *B01J 20/103* (2013.01); *B01J 20/20* (2013.01); *B01J 20/28004* (2013.01); *B01J 20/3475* (2013.01); *C09F 1/04* (2013.01)

(58) Field of Classification Search
CPC ... C09F 1/02; C09F 1/04; B01J 20/103; B01J 20/28004
See application file for complete search history.

(56) References Cited

U.S. PATENT DOCUMENTS

| | | | | |
|---|---|---|---|---|
| 2,317,797 | A * | 4/1943 | Oliver | C09F 1/00 530/209 |
| 2,846,429 | A * | 8/1958 | Howard | C09F 1/02 530/228 |
| 3,489,740 | A | 1/1970 | Cholet et al. | |
| 6,248,230 | B1 * | 6/2001 | Min | C10G 67/04 208/211 |
| 2004/0161389 | A1 | 8/2004 | Gallis et al. | |
| 2007/0049727 | A1 | 3/2007 | Pollock et al. | |

FOREIGN PATENT DOCUMENTS

| | | |
|---|---|---|
| EP | 3064558 A1 | 9/2016 |
| JP | 2008031362 A | 2/2008 |
| WO | 2015048426 A2 | 4/2015 |
| WO | 2016109206 A2 | 7/2016 |

OTHER PUBLICATIONS

Ralph K. Iler, The Chemistry of Silica, 622-56, 1979.*
Dechang Wang et al., "Study of Adsorption Characteristics in Silica Gel-Water Adsorption Refrigeration," 113 Applied Energy 734 (2014).*
Andrey N. Evdokimov et al., "Desulfurization of Black Liquor Soap for Production of Crude Tall Oil with Lower Sulfur Content," 51 Wood Sci. Technol. 1353 (2017).*

* cited by examiner

*Primary Examiner* — Nicholas E Hill

(57) ABSTRACT

A process for reducing or removing at least 90% of sulfur in a tall oil composition, e.g., to a level of 15 ppm or less is disclosed. The process employs at least a first desulfurization and a second desulfurization treatment in parallel or in series. The first treatment comprises adsorptive desulfurization, wherein the adsorbent material comprises silica adsorbent having an average pore size between 50-200 Å, BET surface area of at least 300 m$^2$/g, pore volume of 1.20 to 3.00 cc/g, and a silanol [Si—OH] level of 0.5 to 5 unit/nm$^2$. The second desulfurization treatment is selected from adsorptive treatment, heat treatment, distillation, extraction, oxidation, reduction, hydrogenation, and sulfur scavenging for a reduced sulfur content.

12 Claims, No Drawings

DESULFURIZED TALL OIL AND DERIVATIVES THEREOF

RELATED APPLICATIONS

This application claims benefit to U.S. provisional application Ser. No. 62/851,373 with a filing date of May 22, 2019, the entire disclosure is incorporated herein by reference.

FIELD

The invention relates to tall oil and derivatives compositions having low sulfur content, as well as methods of using and making the same.

BACKGROUND

Economic and environmental considerations are forcing great market demand for renewable resources of raw materials, including those utilized in the transportation industry such as the fuel and fuel package market. As standards increasingly require reduced sulfur content, fuel packages and fuel additives must comply with regulations. There is a need for fuels, fuel packages, and fuel additives to have low sulfur content therein.

Tall oil products such as tall oil fatty acid (TOFA) and derivatives such as esters and alcohols, as well as fatty acid compositions containing the same is one such source of such fuels and/or fuel additives. TOFA and derivatives are considered valuable as a fuel and/or fuel additive due to their low temperature stability properties, especially as compared to vegetable and/or non-woody-based oil and/or fatty acid products. However, sulfur species are introduced into tall oil products during the Kraft process, which includes the addition of sodium sulfide and sodium hydroxide to wood chips for digestion, and then the neutralization/acidification of the basic mixture with sulfuric acid. Both of these processes can generate sulfur species which are incorporated in the crude tall oil (CTO). Further refinement through fractional distillation of the CTO generally concentrates the sulfur species into specific product streams (pitch, rosin, and heads). However, it does not eliminate the sulfur species from TOFA to the required extent.

The drive for more environmentally friendly automobiles will require lower sulfur fuel, fuel additives and fuel packages. There is also a need for the downstream conversion of products such as TOFA into useful value-added chemistries, e.g., the hydrogenation of tall oil products into alcohols. Conventional tall oil products contain so much sulfur that hydrogenation noble metal catalysts can be contaminated by the these sulfur containing species, thus "killing" or "poisoning" the catalyst and making the conversion of such conventional tall oil products economically inefficient.

There exists a continuing need for tall oil products from renewable resources in a manner so as to ensure low sulfur content, and maintain low temperature stability thereof.

SUMMARY OF THE INVENTION

In one aspect, a process for desulfurizing a tall oil composition is disclosed. The process comprises: subjecting the tall oil composition to a first desulfurization treatment via adsorptive desulfurization using a fixed bed containing an adsorbent material and at least a second desulfurization treatment selected from adsorptive treatment, heat treatment, distillation, extraction, oxidation, reduction, hydrogenation, and sulfur scavenging for a reduced sulfur content. The first desulfurization treatment is before or after the second desulfurization treatment. After treatment, the reduced sulfur content is less than 50% of the first sulfur content. The adsorbent material comprises silica adsorbent having an average pore size between 50-200 Å, BET surface area of at least 300 $m^2/g$, pore volume of 1.20 to 3.00 cc/g, and a silanol [Si—OH] level of 0.5 to 5 unit/$nm^2$. In embodiments, the fixed bed is operated at an adsorption temperature of 20-30° C., at one bar pressure, and at a superficial velocity (V) of at least 0.3 ft/hr.

DESCRIPTION

The following terms will be used throughout the specification.

"Tall oil" or "crude tall oil" or CTO refers to a byproduct of the Kraft process of wood pulp manufacture. Crude tall oil contains generally both saturated and unsaturated terpenoid oxygen-containing organic compounds such as rosins, sterols (such as beta-sitosterol), rosin acids (mainly abietic acid and its isomers, dehydroabietic acid, and pimaric acid and its isomers), sterols, and terpenols. CTO also contains fatty acids (mainly linoleic acid, oleic acid and linolenic acid), fatty alcohols, as well as minor amounts of inorganic impurities and some residual lignin fragments. "Tall oil" also refers to fatty acids and free fatty acids derived from tall oil and esters derived from tall oil or tall oil free fatty acids.

"Fatty acid" and "fatty acids", whether in reference to linear, branched or cyclic fatty acids, are used interchangeably, referring to one or more compounds of the formula R1—COOH wherein R1 is a hydrocarbon having at least 4 carbon atoms that is optionally substituted with one or more hydroxyl groups, or derivatives thereof. Further, the —COOH group is an carboxylic acid group. The fatty acid may contain any number of hydroxyl groups and may vary widely based upon the number of carbon atoms present in the fatty acid. The fatty acids may contain, n, acid functional groups, where n may be from 1 to 10. The "fatty acid" or "fatty acids" may be a single fatty acid structure or may be a mixture of different fatty acid structures. The fatty acid may contain stearic acid, oleic acid, and/or linoleic acid, or mixtures thereof.

"Terpene-based" compounds refer to compositions typically composed of $C_{10}H_{16}$ terpenes, obtained from plants, terpene oils, distillation bottoms from terpene distillation and flavorants and/or fragrance industry, by-products from forest industry, e.g., from kraft pulping process of coniferous wood, also called as crude sulphate turpentine ("CST"). Monoterpenes are a wide range of volatile hydrocarbons having a chemical formula of $C_{10}H_{16}$, typically including unsaturated mono- and bicyclic hydrocarbons, with alpha-pinene, beta-pinene and delta-3-carene as components, and with mostly alpha-pinene.

"Crude Sulphate Turpentine" or "CST" refers to a composition mainly composed of mixtures of monoterpenes which is formed and collected during Kraft paper pulping processing.

"Odor intensity" refers to the strength of an odor, or sensation of the odor results from the interaction of volatile chemical substances with the olfactory system. Odor intensity can be expressed by an odor intensity scale with a numerical value as under the Offensive Odor Control Act of Japan revised in 1995: 0 (no odor), 1 (barely perceivable odor), 2 (weak but barely discernible odor), 3 (easily discernible odor), 4 (rather strong), 5 (intense). For example, concentrations at the odor intensity grade 5 indicating intense odor are: 40 ppm with ammonia, 8 ppm with hydrogen sulfide, 0.2 ppm with methyl mercaptan, 1.9 ppm with acetic acid, and 10 ppm with acetaldehyde. Odor intensity assessment can be carried out by a panel of organoleptically trained experts.

The disclosure provides methods for reducing the sulfur content ("desulfurizing") of a fatty acid-containing composition (FAC) such as tall oil or, and also provides fatty acid-containing compositions that demonstrate low sulfur content, by adsorption with packing adsorbent materials. The FAC with reduced sulfur content and low temperature stability is environmental friendly, suitable for use in a fuel, fuel package, and/or fuel additive. Adsorption is the adhesion of atoms, ions or molecules from a liquid or dissolved solid to a surface. In embodiments, depending on the quality of the tall oil feedstock, adsorption is employed as the sole process step or in addition to other process steps, e.g., heat treatment, oxidation, extraction, etc.

Feedstock for Desulfurization: In embodiments, the feedstock is a fatty acid containing composition, which can be a crude tall oil (CTO). Alternatively, the feedstock is selected from the group consisting of a crude sulphate turpentine (CST), depitched crude tall oil, distilled crude tall oil, tall oil fatty acid, distilled tall oil, tall oil rosin, tall oil pitch and any combination thereof. The feedstock can be the by-products of the Kraft process, or an intermediate process stream generated in the desulfurization process, which contains tall oil with some of the sulfur removed. The term feedstock, or TOFA, may be used interchangeably with "tall oil" in this disclosure.

The feedstock is typically dark in color mainly due to the presence of colored impurities, e.g., having a Gardner color of >6. Sulfur content is dependent on the feedstock type and ranges from at least 40 ppm up to 10,000 ppm or more. For example, TOFA in general has a relatively low sulfur content of 40-100 ppm, whereas crude CST in general will have a sulfur content higher than 1000 ppm. The sulfur compounds generally are sulfides, including dimethyl sulfide (DMS), dimethyl disulfide (DMDS), hydrogen sulfide ($H_2S$) and higher molecular weight sulfides; mercaptans, including methyl mercaptan (MM); elemental sulfur, and oxidized sulfur compounds such as sulphates, sulfoxides and sulfones, including the corresponding oxidized species of sulfides and mercaptans.

Typically, tall oil also contains minor amounts of inorganic impurities like residual metals such as Na, K, Ca, Fe, and other elements like phosphorus and silicon that can be harmful to the activity of an applied catalyst.

In embodiments, the untreated tall oil feedstock has an odor due to the presence of volatile components, including sulfur containing components such as sulfides, etc., with an odor intensity grade of at least 2, or at least 3, or at least 4, on odor intensity scale of Offensive Odor Control Act, depending on the initial amount of odor-causing species.

Method for Desulfurization via Adsorption: The method includes providing at least an adsorption column and packing adsorbent particles. In this disclosure, adsorbent may be used interchangeably with sorbent. In embodiments, the adsorbent particles are arranged in layers of different adsorbent types from outlet end to feed end in a single column. In other embodiments, multiple columns may be used, wherein each column only contains a single adsorbent type. In yet other embodiments, a combination of columns that contain a single adsorbent type, or a single column that contains layered particles of different adsorbent types are used. Additionally, a combination of columns operated in parallel may be used to reduce operating pressures, or a series-parallel column configuration may be used to improve yield or through-put.

The adsorbent bed can be any of fixed bed, moving bed, simulated moving bed, single-stage, multi-stage, or countercurrent system. Multiple adsorbent beds can be employed in series, employing the same or different sorbent materials, e.g., the first bed containing activated carbon and the second bed containing silica gel, etc., for an overall desulfurization efficiency of almost 100% sulfur removal. The desulfurization efficiency may depend on factors including temperature of the bed, adsorption capacity of the bed, selectivity, durability and regenerability of the sorbent.

In embodiments, the feedstock is brought into contact with an adsorbent material in an adsorbent column at a controlled flow rate corresponding to a superficial velocity (V) value of at least 0.3 ft/hr, or at least 0.5 ft/hr, or at least 1 ft/hr, or from 1-4 ft/hr, or at least 5 ft/hr. The effluent liquid from the adsorbent bed is analyzed at regular intervals of time for total sulfur content. The passage of feedstock into the adsorbent bed is terminated when the total sulfur content in the effluent reaches a certain predetermined level, which defines the adsorption cycle.

The adsorbent particles comprise an inorganic silica in particle form. "Silica" refers to any of silica gels, fumed silicas, or precipitated silicas. The silica can be in a hydrogel or a xerogel form. The primary characteristics relate to surface area, pore volume, average pore size, average particle size, Si—OH (silanol) level, and the gel pH. Additional characteristics may include impurities level (as ppm).

A pore volume quality of the adsorbent particles represents the total interior volume of the particles. In embodiments, the pore volume (total) is at least 1.20 cc/g, or at least 1.30 cc/g, or at least 1.5 cc/g, or between 1.20 to 3.00 cc/g, or less than 5.0 cc/g based on the Barrett-Joyner-Halenda (BJH) pore volume measurement technique. Total pore volume is given by the sum of the pore volumes of all adsorbent particles over the entire pore size range present in the adsorbent sample.

In embodiments, the adsorbent particles can be further characterized by pore size, i.e., pore diameter. Usually, adsorbent silica materials that provide a mesoporous surface, or a combination of mesoporous and microporous surfaces can be used. The selected pore size depends on various factors, such as the particular type of silica used, the specific type of oil being treated, the impurities initially present in the oil, the size and wetting characteristics of the impurities, and/or the chemical nature of the impurities, e.g., whether such impurities are polar or non-polar. In embodiments, the adsorbent materials have an average pore size of at least 50 Å, or at least 75 Å, or at least 90 Å, or at least 100 Å, or between 50-200 Å.

The average particle size (diameter) of the silica particles is usually in the range of 10 to 500 μm, or at least 75 μm, or at least 30 μm, or at least 50 μm, or at least 100 μm, depending on the commercial grade of the silica. Generally, a total surface area of the silica adsorbent particles is at least 300 $m^2/g$, or at last 400 $m^2/g$, or at least 500 $m^2/g$, or between 300 to 1000 $m^2/g$, based on the Brunauer-Em-mett-Teller (BET) measurement technique.

In embodiments, the absorbent silica gel is characterized as having a silanol [Si—OH] level of 0.5 to 5 unit/$nm^2$, or at least 1 unit/$nm^2$, or less than 5 unit/$nm^2$.

In embodiments, the absorbent silica gel has a pH of less than 9, or less than 8, or less than 7, or between 6 and 8.

In embodiments, the adsorbent silica gel is characterized as having an equilibrium sulfur loading capacity of at least 1 mg S/g of adsorbent (for a specification of less than 10 ppm), or at least 2 mg S/g of adsorbent, at least 3 mg S/g of adsorbent, or at least 10 mg S/g of adsorbent, or at least 15 mg S/g of adsorbent, or in a range of 5-20 mg S/g of adsorbent.

In embodiments, the tall oil feedstock is passed through two desulfurization treatments in series, one with silica gel, and one with activated carbon as adsorbent. The treatment can be with two separate columns in series, or a single column with layers of different adsorbents, e.g., a silica gel layer, then an activated carbon layer, with the silica gel treatment being either before or after the activated carbon treatment.

Optional Heat Treatment: In embodiments, heat treatment can be carried out on the feedstock as a preliminary step to convert the color and odor bodies (i.e., the sulfur compounds) into a form that can be easily separated in subsequent treatment/separation steps. When heated, some of the sulfur compounds are converted to heavier materials with lower volatility that would facilitate removal in a subsequent distillation step, or for easier adsorption/removal to selected adsorbents. Heating can also cause removal by evaporation of sulfur compounds having a relatively high volatility or decompose sulfur compounds into more volatile derivatives and thereby lead to a reduced sulfur content of the remaining material. In embodiments, heating is conducted under conditions with a relatively low oxygen concentration such as in an inert atmosphere like in a nitrogen atmosphere or in vacuum.

In embodiments, the heat treatment is carried out for a sufficient amount of time and at a sufficient temperature, e.g., at least 150° C. and for at last 1 hrs. in an inert environment (e.g., substantially free of oxygen or other reactive air), at least 200° C. and for at least 5 hours, or at least 250° C. for at least 5 hours, or from 250 to 300° C. for 1-4 hours.

Optional/Additional Adsorption Steps: In embodiments depending on the interaction mechanism between the sulfur compounds and sorbents, additional adsorption can be employed with any of: (i) adsorptive desulfurization, (ii) reactive adsorption, and (iii) combinations.

In embodiments, the additional adsorption step comprises using activated carbon as adsorbents. Activated carbon is typically produced by recycling of cheaper abundantly available materials, e.g., from waste materials from wood industry or agriculture. High surface areas can be obtained using either physical or chemical activation, with combined treatments to enhance the surface properties of the adsorbent, therefore increasing its adsorption capacity to end up with similar values as commercially available activated carbon.

In other embodiments, the additional adsorption step is with sorbents such as alumina, zeolites, molecular sieve, clay, activated clay, etc., at a temperature of less than 150° C. An example is a sorbent bed comprising activated carbon and zeolite, e.g., or a two-bed combination with a first bed containing activated carbon at a temperature of at least 60° C., and the second bed containing zeolite, or a single-sorbent bed containing activated carbon.

Adsorbent Regeneration: After the adsorbent has been used up to their capacity, with effluent from the adsorbent bed being is analyzed for total sulfur content at regular intervals of time to determine when regeneration start. Regeneration of the loaded or spent mesoporous adsorbent can start by first blowing nitrogen through the column to remove TOFA, then by counter-currently flowing through the adsorbent bed, a polar solvent such as methanol, ethanol, acetone or any other solvent or mixture of solvents as may be found suitable for the purpose. In one embodiment, the solvent is water. Lastly, with the removal of solvent by blow/drying with an inert gas like nitrogen.

In the regeneration process, effluent from the adsorbent bed during the regeneration cycle is analyzed for total sulfur content at regular intervals of time and countercurrent flow of polar solvent (regenerant) is terminated when the total sulfur content drops to below detection limits. This defines the regeneration cycle of the process. In embodiments, the regeneration of the adsorbent is as disclosed in U.S. Pat. No. 6,248,683B1, incorporated herein by reference.

Properties of The Desulfurized Composition: Depending on the properties of the feedstock stream, in embodiments, more than 90% of the sulfur is removed, or with more than 95% removal, or with more than 99% removal for various types of sulfur compound, for a sulfur level of <20 ppm, or <15 ppm, or <10 ppm, or <5 ppm, or <1 ppm. It should be further noted that the composition of the treated (desulfurized) TOFA remains essentially intact for major components such as oleic acid, linoleic acid, and conjugated linoleic acid. Additionally, after treatment for a feedstock containing up to 0.3 wt. % of color species such as dimethoxylstilbene, the color species is not detectable by GC. The acid value of the tall oil remains essentially unchanged, e.g., with less than 5% variation from original value.

In addition to sulfur content reduction and improved color, the obtained tall oil also exhibits other favorable features a reduced odor intensity and ameliorated odor hedonic tone properties. Odor hedonic tone refers to the degree of pleasantness of an odor. The odor intensity reduction is at least 1 unit, or at least 2 units, or at least 3 units on the odor intensity scale of 0 to 5 of Offensive Odor Control Act. In embodiments, the desulfurized tall oil has a Gardner color of less than 3, of less than 2, or less than 1.

Applications: The composition with reduced sulfur levels ("desulfurized tall oil") can be used as a fuel additive and/or a fuel blend component, e.g., as a lubricity improver and/or as a fatty acid alkyl ester containing fuel. It can also be used as a biofuel, e.g., middle distillates, diesel, gas oil, gasoline, aviation fuel, biofuel and kerosene. The fuel may also be a low sulphur fuel and/or an ultra-low sulfur fuel with any of <10 ppm sulfur, <7 ppm sulfur, <5 ppm sulfur, <3 ppm sulfur, essentially sulfur free containing no sulfur and/or trace amounts of sulfur, depending on the application.

Examples: The following examples are intended to be non-limiting.

Examples 1-9: In the batch treatment Examples, 150 grams sample of commercially available TOFA product available from Kraton Chemical is mixed with 2.5 wt. % of adsorbents for 30 minutes at 25° C. in a flask equipped with mechanical stir set at 300 RPM. The TOFA (designated as TOFA1) has an initial sulfur content of 70-100 ppm and an initial color of 5-6 Gardner, fatty acid concentration of 93.%, rosin acid of 2.5%, acid value of 194 mg KOH/g. Properties of the adsorbents used in the Examples are shown in Table 1.

The sample is filtered to remove the adsorbent then analyzed for both color and sulfur measurements. Each example was repeated 3 more times under the same condition with the TOFA feedstock being the treated material from the previous treatment. Results are shown in Table 2 with the color and sulfur being measured at the end of each batch treatment.

TABLE 1

| Adsorbent Material | SA m²/g | PV cc/g | Pore Size Å | Particle size Malvern d50 μm | [Si—OH] unit/nm² | Gel pH |
|---|---|---|---|---|---|---|
| 162 | 513 | 1.38 | 107 | 15 | 3.7 | >7 |
| 167 | 920 | 2.38 | 104 | 100 | 4.5 | <7 |
| 169 | 822 | 1.96 | 95 | 100 | 1.0 | <7 |
| 170 | 334 | 1.11 | 133 | 15 | 1.0 | >7 |
| 102 | 818 | 0.61 | 30 | <500 | 4.5 | <7 |
| 103 | 550 | 1.1 | 80 | <500 | 4.5 | <7 |
| 104 | 418 | 1.07 | 103 | <500 | 4.5 | <7 |
| 105 | 350 | 1.1 | 125 | <500 | 4.5 | <7 |
| 104 | 311 | 1.12 | 143 | <500 | 4.5 | >7 |

TABLE 2

| | | Before | | Treatment 1 | | Treatment 2 | | Treatment 3 | | Treatment 4 | |
|---|---|---|---|---|---|---|---|---|---|---|---|
| Ex. | Material | Color | S | Color | S | Color | S | Color | S | Color | S |
| 1 | 162 | 4.0 | 75.8 | 3.5 | 54.9 | 3.2 | 46.3 | 3.1 | 42.0 | — | — |
| 2 | 167 | 4.0 | 75.8 | 1.6 | 44.0 | 0.7 | 39.5 | 0.6 | 40.1 | 0.5 | 38.7 |
| 3 | 169 | 5.1 | 75.8 | 3.7 | 40.0 | 3.1 | 32.0 | 2.3 | 27.0 | 1.9 | 22.0 |
| 4 | 170 | 5.1 | 75.8 | 4.0 | 44.0 | 3.5 | 38.0 | 3.1 | 34.0 | 2.6 | 30.0 |
| 5 | 102 | 5.5 | 90.0 | 5.0 | 55.0 | 4.5 | 42.0 | 4.2 | 37.0 | 3.9 | 32.0 |
| 6 | 103 | 5.5 | 90.0 | 4.6 | 48.0 | 4.0 | 36.0 | 3.5 | 28.0 | 3.2 | 25.0 |
| 7 | 104 | 5.5 | 90.0 | 4.5 | 49.7 | 3.9 | 37.1 | 3.6 | 31.1 | 3.3 | 28.9 |
| 8 | 105 | 5.5 | 90.0 | 4.4 | 52.6 | 4.0 | 38.4 | 3.6 | 32.3 | 3.3 | 28.1 |
| 9 | 104 | 5.5 | 90.0 | 5.3 | 79.0 | 5.2 | 75.0 | 5.1 | 71.0 | 5.0 | 69.0 |

Examples 10-11: The batch treatment Examples are repeated again with adsorbent 167 and 162, and with a different TOFA feedstock, TOFA2 with starting color of 3.7 (Gardner) and sulfur level of 46.2 ppm. Results are as shown in Table 3. After treatment 1, treated samples showed a reduction in odor intensity of at least 1 unit. After treatment 4, treated samples showed an odor reduction of at least 2 units.

TABLE 3

| | | Before | | Treatment 1 | | Treatment 2 | | Treatment 3 | | Treatment 4 | |
|---|---|---|---|---|---|---|---|---|---|---|---|
| Ex. | Material | Color | S | Color | S | Color | S | Color | S | Color | S |
| 10 | 167 | 3.7 | 46.2 | 1.8 | 16.5 | 0.9 | 14.1 | 0.7 | 15.1 | 0.6 | 14.2 |
| 11 | 162 | 3.7 | 46.2 | 3.1 | 24.7 | 2.8 | 16.9 | 2.6 | 13.6 | — | — |

Example 12: The batch treatment Example was repeated with TOFA1 as feedstock, and with granular activated carbon as the adsorbent, having a mean particle diameter of 0.9-1.1 nm, iodine number of 1000 (min) mg/g, 5 (max) % of 12 US Mesh, and 4 (max) % of <40 USMesh. Results are as shown in Table 4:

TABLE 4

| | Before | | Treatment 1 | | Treatment 2 | | Treatment 3 | | Treatment 4 | |
|---|---|---|---|---|---|---|---|---|---|---|
| Example | Color | S | Color | S | Color | S | Color | S | Color | S |
| 12 | 5.5 | 90.0 | 5.0 | 84.0 | 4.7 | 81.0 | 4.5 | 79.0 | 4.3 | 77.0 |

Examples 13-18: In the examples, TOFA1 feedstock was via a fixed bed process using a packing column 9" long with OD 2.5" (ID 2.25"). The column volume is 0.5 liter. All the treatment is conducted at ambient temperature with pressure of <150 psig. The first two columns, Absorbent 167 was used. In the first column, activated carbon was used. The activated carbon has an iodine number of 1020 (min) mg/g, −325 mesh, and apparent density of 0.30. Color was measured using based on Hunter Lab instrument, according to ASTM D6045. Results are shown in Table 5. After column THREE, the treated samples had a reduction in odor intensity of at least 2 units compared to the untreated feedstock.

TABLE 5

| Examples | ONE | | TWO | | THREE | |
|---|---|---|---|---|---|---|
| | Hunter G | Sulfur, ppm | Hunter G | Sulfur, ppm | Hunter G | Sulfur, ppm |
| 13 | 3.4 | 30 | 1.6 | 22 | 0.5 | — |
| 14 | 3.5 | — | 1.9 | — | 0.7 | <10 |
| 15 | 3.7 | — | 2.2 | — | 0.8 | 11 |
| 16 | 3.7 | — | 2.4 | — | 0.9 | 12 |
| 17 | 3.7 | — | 2.7 | — | 1.1 | 15 |
| 18 | 4.0 | 34 | 3.3 | 29 | 1.3 | 16 |

Example 19: Treated TOFA1 from example 14 was analyzed for fatty components and compared with untreated sample TOFA1. Results are shown in Table 6. Example 14 had reduction in odor intensity of at least 2 units.

TABLE 6

| Fatty Acid Type/Component | Untreated TOFA1 | Example 14 TOFA1 treated with both silica and carbon | Example 14 TOFA1 treated with silica only-without carbon treatment |
|---|---|---|---|
| PALMITIC (C16) ACID | 0.9 | 2.0 | 2.1 |
| C17:0 FATTY ACID ISOMER | 0.4 | 0.8 | 0.8 |
| C17:0 FATTY ACID | 0.2 | 0.2 | 0.2 |
| STEARIC (C18) ACID | 2.1 | 2.2 | 2.4 |
| ELAIDIC (C18:1) ACID | 1.3 | 1.9 | 1.0 |
| OLEIC (C18:1) ACID | 40.6 | 40.2 | 43.0 |
| C18:1 FATTY ACID | 0.6 | 0.5 | 0.2 |
| C19:0 FATTY ACID | 0.5 | 0.6 | 0.6 |
| C18:2 FATTY ACID ISOMERS | 2.2 | 2.6 | 2.4 |
| LINOLEIC (C18:2) ACID | 31.3 | 28.4 | 28.3 |
| PINOLENIC (C18:3) ACID | 1.9 | 1.7 | 1.6 |
| LINOLENIC (C18:3) ACID | 0.3 | 0.2 | 0.3 |
| EICOSANOIC (C20) ACID | 0.2 | 0.4 | 0.5 |
| EICOSENOIC (C20:1) ACID | 0.3 | 0.4 | 1.0 |
| CONJ. LINOLEIC (C18:2) ACIDS | 7.3 | 7.0 | 5.8 |
| EICOSADIENOIC (C20:2) ACID | 0.5 | 0.7 | 0.9 |
| C18:3 FATTY ACIDS | 1.0 | 1.1 | 0.3 |
| EICOSATRIENOIC (C20:3) ACID | 2.0 | 2.9 | 2.9 |
| DIMETHOXYSTILBENE | 0.3 | 0.0 | 0.0 |
| UNIDENTIFIED | 4.3 | 4.9 | 5.5 |
| TOTAL WEIGHT PERCENT BY GC | 98.2 | 98.6 | 99.8 |
| Total Sulfur ANTEK ppm. | 90 | <10 | 11 |
| Color | 5 | <1 | 1 |
| Acid value mgKOH/g | 197 | 197 | 197 |

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A process for desulfurizing a tall oil feedstock having a first sulfur content and an initial odor intensity, comprising:

contacting the tall oil feedstock with two adsorbent beds in series, a first adsorbent bed containing a first adsorbent material and a second adsorbent bed containing a second adsorbent material, obtaining a desulfurized tall oil composition having a reduced sulfur content;

wherein at least one of the first adsorbent material and the second adsorbent material comprises silica adsorbent having an average pore size between 50-200 Å, BET surface area of 300-1000 $m^2/g$, pore volume of 1.00 to 3.00 cc/g, a silanol [Si—OH] level of 0.5 to 5 unit/$nm^2$, and an equilibrium sulfur loading capacity of at least 1 mg S/g of adsorbent material;

wherein the wherein the adsorbent bed comprising silica adsorbent is operated at an adsorption temperature of 20-30° C., at one bar pressure, and at a superficial velocity (V) of at least 0.3 ft/hr;

wherein the reduced sulfur content is less than 50% of the first sulfur content wherein the desulfurized tall oil has an odor intensity reduction of at least 1 unit on odor intensity scale of Offensive Odor Control Act as compared to the initial odor intensity of the tall oil feedstock;

wherein the silica adsorbent is regenerated adsorbent material.

2. The process of claim 1, wherein the first adsorbent bed and the second adsorbent bed are in same adsorbent column or different adsorbent columns.

3. A process for desulfurizing a tall oil feedstock having a first sulfur content and an initial odor intensity, comprising:

a) providing an adsorbent material;

b) subjecting the tall oil feedstock to a first desulfurization treatment by contacting the adsorbent material in an adsorbent bed, wherein the adsorbent material adsorbs a portion of the first sulfur content, wherein the adsorbent bed is operated at an adsorption temperature of 20-30° C., at one bar pressure, and at a superficial velocity (V) of at least 0.3 ft/hr;

c) subjecting the tall oil after the first desulfurization treatment to at least a second desulfurization treatment selected from adsorptive treatment, heat treatment, distillation, extraction, oxidation, reduction, hydrogenation, and sulfur scavenging, obtaining a desulfurized tall oil composition having a reduced sulfur content;

d) collecting the adsorbent material after the first desulfurization treatment;

e) regenerating the collected adsorbent material by passing a solvent over the collected adsorbent material for a sufficient period of time for desorption of at least a portion of the first sulfur content from the collected adsorbent material;

wherein the first desulfurization treatment is before or after the second desulfurization treatment;

wherein the reduced sulfur content is less than 50% of the first sulfur content;

wherein the adsorbent material comprises silica adsorbent having an average pore size between 50-200 Å, a BET surface area of 300-1000 $m^2/g$, pore volume of 1.00 to 3.00 cc/g, a silanol [Si—OH] level of 0.5 to 5 unit/$nm^2$, and an equilibrium sulfur loading capacity in the range of 5-20 mg S/g of adsorbent;

wherein the desulfurized tall oil has an odor intensity reduction of at least 1 unit on odor intensity scale of Offensive Odor Control Act as compared to the initial odor intensity of the tall oil feedstock; and wherein the adsorbent material in step a) is regenerated adsorbent material.

4. The method of claim 1, wherein the desulfurized tall oil has an odor intensity of reduction of at least 2 units on odor intensity scale of Offensive Odor Control Act as compared to the initial odor intensity of the tall oil feedstock.

5. The process of claim 3, wherein the adsorption bed is operated at a superficial velocity (V) of at least 1 ft/hr.

6. The process of claim 3, wherein the solvent used for regenerating the adsorbent material is selected from methanol, ethanol, acetone and mixtures thereof.

7. The process of claim 3, wherein the second desulfurization treatment is an adsorptive treatment.

8. The process of claim 7, wherein the adsorptive treatment comprises using an adsorbent material comprising any of activated carbon, clay, hydrated alumina, zeolite, calcium exchanged zeolite, a zinc exchanged zeolite, a manganese compound, copper oxide, iron oxide, zinc oxide, silver salt, copper salt, zeolite doped with a metal salt, alumina doped with a metal salt, and mixtures thereof.

9. The process of claim 3, wherein the first desulfurization treatment comprises using multi-staged adsorbent system with at least two adsorbent beds in series, each containing same or different adsorbent materials.

10. The process of claim 3, wherein the second desulfurization treatment is an adsorptive treatment employing a reagent or catalyst on a support carrier, and wherein the support carrier is selected from activated carbon, clay, acid activated clay, mineral, zeolite, silica, alumina, ion exchange material, polystyrene, and combinations thereof.

11. The process of claim 3, wherein the tall oil feedstock comprises any of crude sulfate turpentine, a crude tall oil, depitched tall oil, a composition derived from crude tall oil, and mixtures thereof.

12. The process of claim 3, wherein the silica adsorbent particles has a surface area of at least 500 $m^2/g$, based on the Brunauer-Em-mett-Teller (BET) measurement technique.

* * * * *